US009197995B1

(12) United States Patent
DeAngelis et al.

(10) Patent No.: US 9,197,995 B1
(45) Date of Patent: Nov. 24, 2015

(54) LOCATION-AWARE SOCIAL MEDIA PLATFORM FOR OWNERS OF NON-HUMAN ANIMALS

(71) Applicants: Luana DeAngelis, New York, NY (US); Alessandro Malaspina, Ansonia, CT (US)

(72) Inventors: Luana DeAngelis, New York, NY (US); Alessandro Malaspina, Ansonia, CT (US)

(*) Notice: Subject to any disclaimer, the term of this patent is extended or adjusted under 35 U.S.C. 154(b) by 0 days.

(21) Appl. No.: 14/499,906

(22) Filed: Sep. 29, 2014

(51) Int. Cl.
*H04W 4/02* (2009.01)
*G06Q 50/26* (2012.01)

(52) U.S. Cl.
CPC ............ *H04W 4/021* (2013.01); *G06Q 50/265* (2013.01)

(58) Field of Classification Search
CPC .. H04W 4/023; H04W 8/005; G08B 13/2462; G08B 13/2482
USPC ................... 455/404.1–2, 456.1–3, 456.5–6; 340/539.13, 539.11, 539.15, 539.18, 340/539.2
See application file for complete search history.

(56) References Cited

U.S. PATENT DOCUMENTS

| | | | |
|---|---|---|---|
| 6,618,593 B1 | 9/2003 | Drutman et al. | |
| 8,295,851 B2 | 10/2012 | Finnegan et al. | |
| 8,447,331 B2 | 5/2013 | Brsch | |
| 8,521,413 B2 | 8/2013 | Koch | |
| 8,725,173 B2 | 5/2014 | Casey | |
| 8,725,174 B2 | 5/2014 | Grossman et al. | |
| 2006/0226996 A1* | 10/2006 | Hisano | 340/586 |
| 2010/0289644 A1* | 11/2010 | Slavin et al. | 340/568.1 |
| 2012/0089689 A1 | 4/2012 | Tan | |
| 2012/0166322 A1 | 6/2012 | Simon | |
| 2012/0312250 A1* | 12/2012 | Jesurum | 119/721 |
| 2013/0113621 A1* | 5/2013 | So | 340/539.13 |
| 2013/0285815 A1* | 10/2013 | Jones, II | 340/573.3 |
| 2014/0077932 A1 | 3/2014 | Rooyakkers | |

FOREIGN PATENT DOCUMENTS

| | | |
|---|---|---|
| EP | 1590975 | 6/2014 |
| WO | 2012/094235 | 7/2012 |

OTHER PUBLICATIONS

WO 2010/138994 a1 Bruenig, Michael, "Power Transmission to Mobile Devices on Animals", Dec. 2010.*
Fido Factor, mychoicefreedom.com [online]. "Five Useful Pet Apps for iPhone," Jun. 4, 2012 (retrieved on Sep. 29, 2014 from URL http://www.mychoicefreedom.com/five-useful-pet-apps-for-iphone/ (6 pages).
Tagg, 'pettracker.com' [online]. "A GPS Tracker for Your Pet," (retrieved on Sep. 29, 2014 from URL http://www.pettracker.com/pet-gps/gps-location-tracking) (3 pages).
Pack, 'packdog.com' [online], "FAQ What is Pack" (retrieved on Sep. 29, 2014 from URL http://packdog.com/faq) (10 pages).

* cited by examiner

*Primary Examiner* — Cong Tran
(74) *Attorney, Agent, or Firm* — Fish & Richardson P.C.

(57) ABSTRACT

An example method of presenting animal-related alerts includes receiving information pertaining to a plurality of non-human animals, where the information includes, for each non-human animal, an indication of a location associated with that non-human animal. The method also includes determining a location of a user's device, determining that a location associated with a particular non-human animal is within a pre-defined distance from the location of the user's device, and generating an alert, where the alert comprises information pertaining to that particular non-human animal. The method also includes presenting, using the user's device, the alert to the user.

20 Claims, 13 Drawing Sheets

LOCATION-AWARE SOCIAL MEDIA PLATFORM FOR OWNERS OF NON-HUMAN ANIMALS

TECHNICAL FIELD

This disclosure relates to social media platforms, and more particularly to social media platforms relating to non-human animals.

BACKGROUND

Non-human animals (e.g., pets) are often kept for a person's company or protection. Examples of these non-human animals include, for example, cats, dogs, birds, reptiles, and other animals. Many non-human animals are social animals and interact highly with humans and other animals (e.g., other animals of the same or different species). As such, an owner of a non-human animal will often introduce his non-human animal into social settings, such that the non-human animal develops and maintains healthy relationships with others. Further, an owner of a non-human animal will often be mindful of humans or animals that might react poorly to his non-human animal, and will avoid introducing his non-human animal into settings that might result in unfavorable interactions. Further still, an owner of a non-human animal will often remain vigilant about his non-human animal's whereabouts, and will search for the non-human animal if the non-human animal wanders away and becomes lost.

SUMMARY

Implementations of a location-aware social media platform relating to non-human animals are described below. Among other things, a social media platform can be used to facilitate interactions between non-human animals and their owners and help in fostering healthy relationships between them.

The social media platform that we describe here may encompass one or more of the following (or other) aspects, features, and implementations, and combinations of them.

In general, in an aspect, a method of presenting animal-related alerts includes receiving information pertaining to a plurality of non-human animals, where the information includes, for each non-human animal, an indication of a location associated with that non-human animal. The method also includes determining a location of a user's device, determining that a location associated with a particular non-human animal is within a pre-defined distance from the location of the user's device, and generating an alert, where the alert comprises information pertaining to that particular non-human animal. The method also includes presenting, using the user's device, the alert to the user.

In general, in another aspect, a system for presenting animal-related alerts includes a server system coupled to a platform module, and a plurality of user devices each coupled to a respective client module. Each client module is operable to receive, from the platform module, information pertaining to a plurality of non-human animals, where the information comprises, for each non-human animal, an indication of a location associated with that non-human animal. Each client module is also operable to determine a location of the respective users device, determine that a location associated with a particular non-human animal is within a pre-defined distance from the location of the respective user device, and generate an alert, where the alert includes information pertaining to that particular non-human animal. The client module is also operable to present, using the respective user device, the alert to a user.

Implementations of these aspect may include or more of the following features.

In some implementations, the information further includes, for each non-human animal, an indication of that non-human animal's disposition towards others. The information can further include, for each non-human animal, an indication of that non-human animal's disposition towards other non-human animals. The information can further include, for each non-human animal, an indication of that non-human animal's disposition towards humans.

In some implementations, at least one of the locations associated with a non-human animal corresponds to a current location of a particular non-human animal.

In some implementations, at least one of the non-human animals was reported as lost, and the location associated with that lost non-human animal corresponds to a reported last known location of the lost non-human animal.

In some implementations, information pertaining to the plurality of non-human animals is received at the user's device.

In some implementations, information pertaining to the plurality of non-human animals is received at the user's device from a server.

In some implementations, the method includes sharing information pertaining to the user with one or more other users, where sharing information pertaining to the user with one or more other users comprises transmitting the location of the user's device to a server. Sharing information pertaining to the user with one or more other users can further include transmitting information pertaining to a non-human animal associated with the user to the server.

In some implementations, the client module is operable to share information pertaining to the user with one or more other users, where sharing information pertaining to the user with one or more other users comprises transmitting the location of the user's device to a server. Sharing information pertaining to the user with one or more other users can further include transmitting information pertaining to a non-human animal associated with the user to the server.

In some implementations, presenting the alert to the user includes determining that the information pertaining to that particular non-human animal satisfies one or more filtering criteria, and upon determining that the information pertaining to that particular non-human animal satisfies one or more filtering criteria, presenting the alert to the user using a user interface of the user's device. The one or more filtering criteria can include a particular time period, a particular physical characteristic, and/or particular identifying information associated with at least a subset of the plurality of non-human animals.

In general, in another aspect, a method of presenting animal-related alerts includes receiving, using a user's device, information pertaining to a plurality of non-human animals, where the information pertaining to the plurality of non-human animals is received from a platform module of a server system, and where the information includes, for each non-human animal, an indication of a location associated with that non-human animal and an indication of that non-human animal's disposition towards others. The method also includes determining, using the user's device, a location of the user's device, and determining, using the user's device, that a location associated with a particular non-human animal is within a pre-defined distance from the location of the user's device. The method also includes generating, using the user's device, an alert, where the alert includes information pertaining to that particular non-human animal including the indication of the location associated with that non-human animal and the indication of that non-human animal's disposition towards others. The method also includes determining, using the user's device, that the information pertaining to that particular non-human animal satisfies one or more filtering criteria, where the one or more filtering criteria includes a particular time period, a particular physical characteristic, and/or particular identifying information associated with at least a subset of the plurality of non-human animals. The method also includes, upon determining that the information pertaining to that particular non-human animal satisfies one or more filtering criteria, presenting the alert to the user using a user interface of the user's device, and sharing information pertaining to the user with one or more other users, where sharing information pertaining to the user with one or more other users includes transmitting, using the user's device, the location of the user's device to the platform module of the server system.

In general, in another aspect, a system for presenting animal-related alerts includes a server system coupled to a platform module, and a plurality of user devices each coupled to a respective client module. Each client module is operable to receive information pertaining to a plurality of non-human animals, where the information pertaining to the plurality of non-human animals is received from the platform module, and where the information includes, for each non-human animal, an indication of a location associated with that non-human animal and an indication of that non-human animal's disposition towards others. Each client module is also operable to determine a location of the respective user's device, determine that a location associated with a particular non-human animal is within a pre-defined distance from the location of the respective user's device, and generate an alert, where the alert includes information pertaining to that particular non-human animal including the indication of the location associated with that non-human animal and the indication of that non-human animal's disposition towards others. Each client module is also operable to determine that the information pertaining to that particular non-human animal satisfies one or more filtering criteria, where the one or more filtering criteria includes a particular time period, a particular physical characteristic, and/or particular identifying information associated with at least a subset of the plurality of non-human animals. Each client module is also operable to, upon determining that the information pertaining to that particular non-human animal satisfies one or more filtering criteria, present the alert to the user using a user interface of the respective user's device, and share information pertaining to the user with one or more other users, where sharing information pertaining to the user with one or more other users includes transmitting the location of the respective user's device to the platform module.

Implementations of these aspect may include or more of the following features.

In some implementations, at least one of the locations associated with a non-human animal corresponds to a current location of a particular non-human animal.

In some implementations, at least one of the non-human animals was reported as lost, and the location associated with that lost non-human animal corresponds to a reported last known location of the lost non-human animal.

In some implementations, the pre-defined distance corresponds to a boundary about the location of the user's device. The boundary can be circular or polygonal.

In some implementations, the method further includes presenting, using the user interface of the user's device, at least a portion of the information pertaining to the plurality of non-human animals to the user.

In some implementations, each client module is further operable to present, using the user interface of the user's device, at least a portion of the information pertaining to the plurality of non-human animals to the user.

Presenting at least a portion of the information pertaining to the plurality of non-human animals can include generating a graphical map depicting a region surrounding the location of the user's device. The graphical map can include one or more icons, each icon corresponding to one of the non-human animal. Each icon can include an indication of a particular non-human animal's disposition towards others. The indication can be a pre-determined color.

The details of one or more implementations are set forth in the accompanying drawings and the description below. Other features and advantages will be apparent from the description and drawings, and from the claims.

DETAILED DESCRIPTION

Implementations of a location-aware social media platform relating to non-human animals are described below. Non-human animals can be for example, pets (e.g., cats, dogs, birds, reptiles, and so forth), livestock (e.g., cows, sheep, pigs, and so forth), work animals (e.g., horses, mules, donkeys, oxen, and so forth), undomesticated animals (e.g., wild lions, tigers, bears, elephants, and so forth), or any other non-human animal.

One or more implementations can be used to facilitate interactions between non-human animals and their owners. For example, some implementations can provide an owner of a non-human animal with the locations of other nearby animals and their owners, such that the animals and their owners can meet and interact. In some cases, users can use the social media platform to avoid certain non-human animals or their owners. For example, some implementations can provide a user with the locations of nearby non-human animals and their owners, and identify non-human animals that might be unfriendly to humans or other animals. In response, the user might travel away from or otherwise avoid those locations in order to avert an undesirable interaction. In some cases, an owner of a non-human animal can use the social media platform to seek the assistance of others in searching for a lost non-human animal. For example, some implementations allow an owner of a non-human animal to provide identifying information regarding a lost non-human animal and the last known location of the non-human animal, and request the assistance of others in searching for the non-human animal. In response, other users can assist in searching for the non-human animal in the appropriate location. In this manner, implementations of the social media platform can facilitate interactions between non-human animals and owners of non-human animals, and help in fostering healthy relationships between them.

Figure 1:
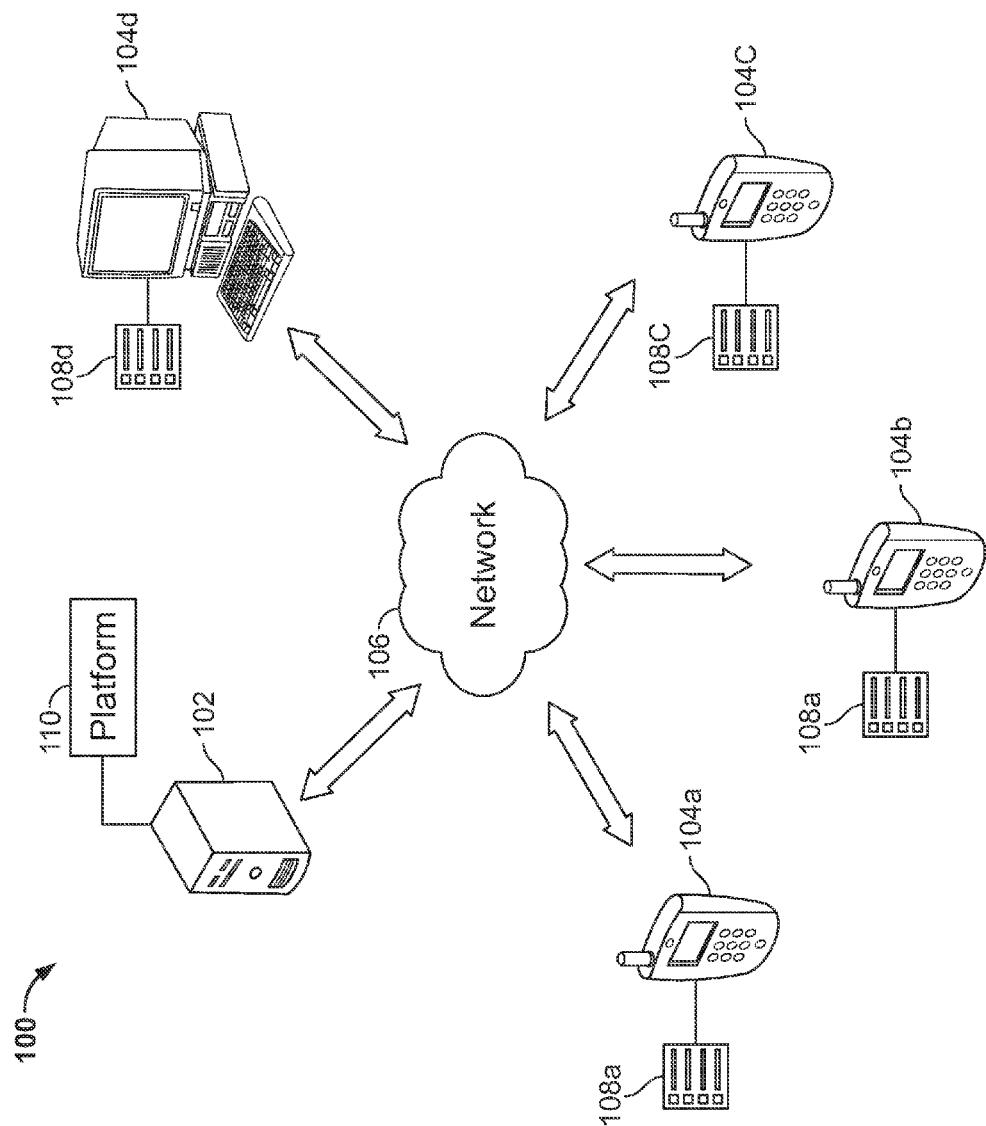
FIG. 1 is a diagram of an example system for implementing a location-aware social media platform for owners of non-human animals.

An example system 100 for implementing a location-aware social media platform for owners of non-human animals is shown in FIG. 1. The system 100 includes a social media platform 110 maintained on a server system 102 that includes one or more servers computers. Server system 102 is communicatively connected to one or more client devices 104a-d through a network 106. Each client device 104a-d includes a user interface 108a-d, and users can interact with user interfaces 108a-d in order to view data (e.g., data on server system 102 and platform 110, or client devices 104a-d), transmit data to other devices (e.g., to server system 102 and platform 110, or other client devices 104a-d), and issue commands (e.g., to server system 102 and platform 110, or client devices 104a-d). In some implementations, a user can install a software application onto a client device 104a-d in order to facilitate performance of these tasks.

A client device 104a-d can be any electronic device that is used by a user to view, process, transmit and receive data. Examples of client devices 104a-d include computers (such as desktop computers, notebook computers, server systems, etc.), mobile computing devices (such as cellular phones, smartphones, tablets, personal data assistants, notebook computers with networking capability), and other computing devices capable of transmitting and receiving data from network 106. Client devices 104a-d can include devices that operate using one or more operating system (for example, Microsoft Windows, Apple OSX, Linux, Unix, Android, iOS, etc.) and/or architectures (for example, x86, PowerPC, ARM, etc.) In some implementations, one or more client devices 104a-d need not be located locally with respect to the rest of system 100, and one or more client devices 104a-d can be located in one or more remote physical locations. In some implementations, the client devices 104a-d can communicate with a geo-positioning system (e.g., a global positioning system (GPS), WiFi triangular system, and so forth) in order to determine its geographical location.

Network 106 can be any communications network through which data can be transferred and shared. For example, network 106 can be a local area network (LAN) or a wide-area network (WAN), such as the Internet. Network 106 can be implemented using various networking interfaces, for instance wireless networking interfaces (such as WiFi, Bluetooth, or infrared) or wired networking interfaces (such as Ethernet or serial connection). Network 106 also can include combinations of more than one network, and can be implemented using one or more networking interfaces.

Server system 102 is illustrated as a single component, but can be implemented on one or more computing devices. Server system 102 can be, for instance, a single computing device that is connected to network 106, and platform 110 can be maintained and operated on the single computing device. In some implementations, server system 102 include multiple computing devices that are connected to network 106, and platform 110 can be maintained and operated on some or all of the computing devices. For instance, server system 102 can include several computing devices, and platform 110 can be distributive on one or more of these computing devices. In some implementations, server system 102 need not be located locally to the rest of system 100, and portions of server system 102 can be located in one or more remote physical locations.

Figure 2:
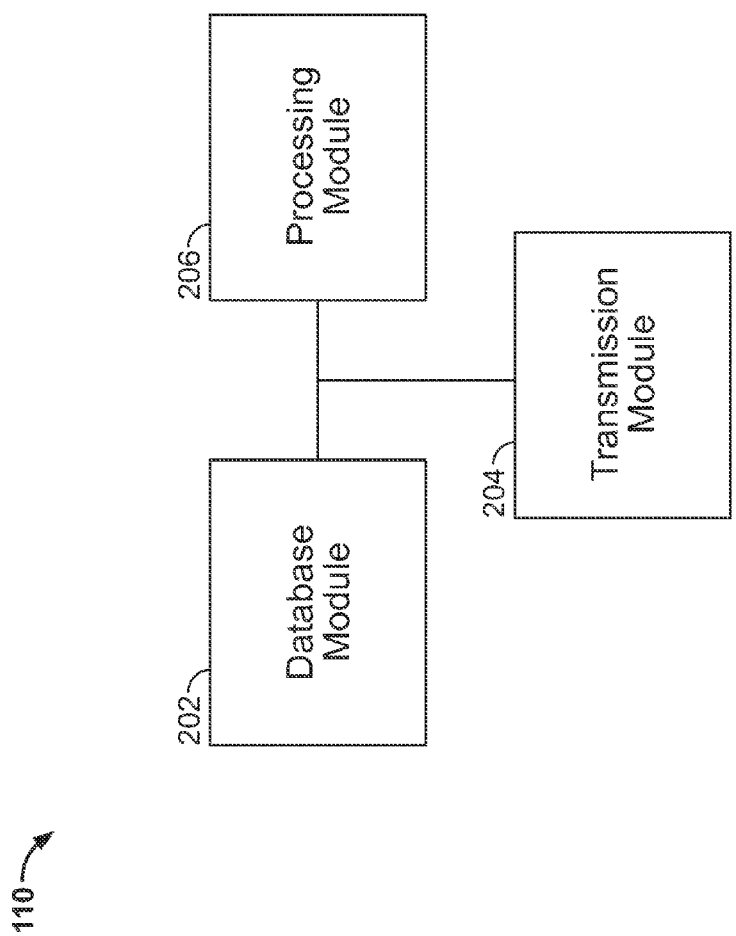
FIG. 2 is a diagram of an example platform.

FIG. 2 shows various aspects of the platform 110. Platform 110 includes several modules that perform particular functions related to the operation of system 100. For example, platform 110 can include a database module 202, a transmission module 204, and a processing module 206.

Database module 202 maintains information related to one or more users of system 100. As example, database module 202 can store information regarding a user's identity credentials (e.g., user name and password), contact information (e.g., e-mail address, physical address, phone number, social media profile links, and so forth), demographic information (e.g., age, gender, geographical region, and so forth), preferences (e.g., system preferences), location (e.g., geographical coordinates, such as those determined using a global positioning system (GPS), WiFi triangulation system, or other geo-positioning system), relationship information (e.g., indications of a user's association with other users), and other user information (e.g., collections of the user's written content, photographs, videos, audio content, and so forth). Database module 202 can also store information regarding a user's non-human animal. For example, database module 202 can store information regarding the non-human animal's identifying information (e.g., name, breed, size, weight, age, appearance, and so forth), location (e.g., geographical coordinates), relationship information (e.g., relationship to a particular user), and other information (e.g., photographs, videos, and audio content relating to the non-human animal). Although different examples of information are described above, these are merely illustrative. In practice, database module 202 can store any information related to the users of platform 110, their non-human animals, or any other information pertaining to platform 110.

Transmission module 204 allows for the transmission of data to and from platform 110. For example, transmission module 204 can be communicatively connected to network 106, such that it can transmit data to client devices 104a-d and receive data from client devices 104a-d via network 106. As an example, information inputted by users on client devices 104a can be transmitted to the platform 110 through transmission module 204. This information can then be processed (e.g., using processing module 206) and/or stored (e.g., using database module 202). As another example, information from the platform 110 (e.g., information stored on database module 202) can be transmitted to one or more client devices 104a-d through transmission module 204.

Processing module 206 processes data stored or otherwise accessible to platform 110. For instance, processing module 206 can execute automated or user-initiated processes that manipulate data pertaining to one or more users or non-human animals. As an example, processing module 206 can manipulate data stored on database module 202, or data that is received from transmission module 204. Likewise, processed data from processing module 206 can be stored on database module 202 and/or sent to transmission module 204 for transmission to other devices. Example processes that can be performed by processing module 206 are described in greater detail below.

Figure 3:
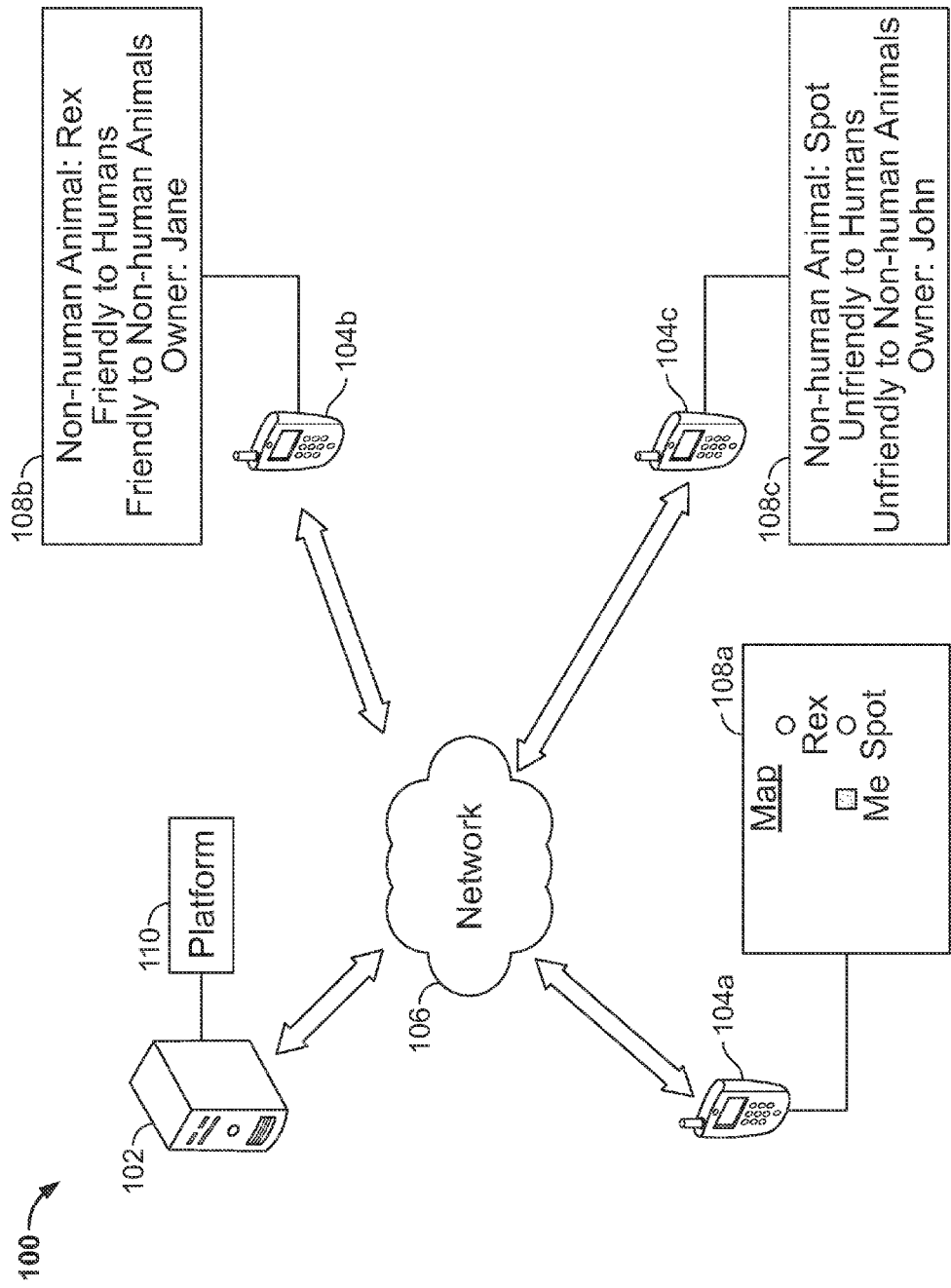
FIG. 3 is a diagram of a location-based function of an example system.

As described above, one or more implementations of the platform 110 can be used to facilitate interactions between non-human animals and their owners. For example, some implementations can provide an owner of a non-human animal with the locations of other nearby non-human animals and their owners, such that the non-human animals and their owners can meet and interact. An example of this functionality is illustrated in FIG. 3. FIG. 3 shows an example system 100 with a server system 102, a platform 110 maintained on server system 102, and three client devices 104a-c. In this example, client devices 104*a-c* are mobile communications devices (e.g., cellular phones, smartphones, tablets, notebook computers, or other portable devices) that are capable of communicating with the server system 102 via network 106. Client devices 104*a-c* also are geographically separated, and are relatively remote from each other (e.g., separated by several feet or miles). In this example, the users of client devices 104*b-c* are owners of non-human animals, and use their respective client devices 104*b-c* to enter information about themselves and/or their non-human animals. For example, each of the users can input information into a respective user interface 108*b-c* of his client device 108*b-c*, such as the name of his non-human animal, the name of the user, an indication of the non-human animal's disposition to others (e.g., whether the non-human animals is friendly to humans and/or other non-human animals), or another other information that he wishes to share with others. In addition, the client devices 104*b-c* are location-aware, and can determine their geographic location, for example by communicating with a geo-positioning system (e.g., GPS, WiFi triangulation system, and so forth). This information (e.g., the information about the user and his non-human animal, and location information regarding the client device 104*b-c*) is transmitted from each client device 104*b-c* to the server system 102. The information transmitted to the server system 102 is processed and stored by the platform 110. For example, the platform 110 can receive information from each client device 104*b-c* using transmission module 204, process the information using the processing module 206, and store the information using the database module 202.

FIG. 3 also shows another client device 104*a*. In this example, a user that is using client device 104*a* wishes to see the information regarding others in his surrounding area. Using his client device 104*a*, the user requests this information from server 102 and platform 110. In response, information from the client devices 104*b-c* is transmitted from the platform 110 (e.g., using the transmission module 204) via the network 106 to the client device 104*a*. The client device 104*a* receives the information, and generates a visual representation of this information. For example, portions of the received information can be used generate a graphical map that displays the location of other users in the area, as well as additional information regarding these users (e.g., information regarding their non-human animals). This map is presented to the user through the user interface 108*a*. The user can interact with the user interface 108*a* in order to learn more about his surroundings. For example, using the map shown in user interface 108*a*, the user can visually determine the location of other users in his vicinity (and correspondingly, the location of their non-human animals), the disposition of the other users' non-human animals, and any other shared information regarding the other users and their non-human animals.

The example implementation shown in FIG. 3 is simplified to show a single map being generated on a single client device based on information obtained from other client devices. In practice, multiple client devices can transmit information to the server 102 and platform 110 and/or receive information from the server 102 and platform 110 in the manner described above. Thus, each user can use his client device to share location information and other information about himself and his non-human animal, and receive shared location information and other information about other users and their non-human animals. Using this information, each user can, for example, seek interaction by traveling towards certain areas, or avoid interaction by walking away from other areas.

In the above example, information regarding several client devices (e.g., client devices 104*b-c*) is transmitted to the server 102, and information regarding each of these client devices 104*b-c* is transmitted from the server 102 to the client device 104*a*. However, in some implementations, the server 102 may transmit information regarding only a subset of the client devices 104*b-c*. For example, in some implementations, upon receiving location information from the client devices 104*a-c*, the server 102 may determine which client devices 104*a-c* are within proximity of each other. In response, the server 102 will send, to each client device, information regarding other client devices that are in proximity to that client device. In this manner, each client device is more likely to receive information that is relevant to its user (e.g., information regarding nearby other users and non-human animals), and is less like to receive information that is not relevant to its user (e.g., information regarding distant users and non-human animal). The server 102 can make a proximity determination is various ways. For example, in some implementations, a server may determine that two client devices are within proximity of each other when they are within a particular pre-determined distance from one another. As another example, in some implementations, a server may determine that two client devices are within proximity of each other when they are within the same arbitrary region (e.g., a particular block, neighborhood, city, county, state, or any other arbitrarily defined region).

Further, although the above example describes a user initiating the transmission of information from his client device and the request for information from the server, in some implementations, the client device can transmit and/or receive information automatically without user input. For example, in some cases, a client device 104*a-c* can continuously, periodically, or arbitrarily transmit information to the server 102 and receive information from the server 102 automatically without requiring that the user specifically initiate these actions.

Figure 4A:
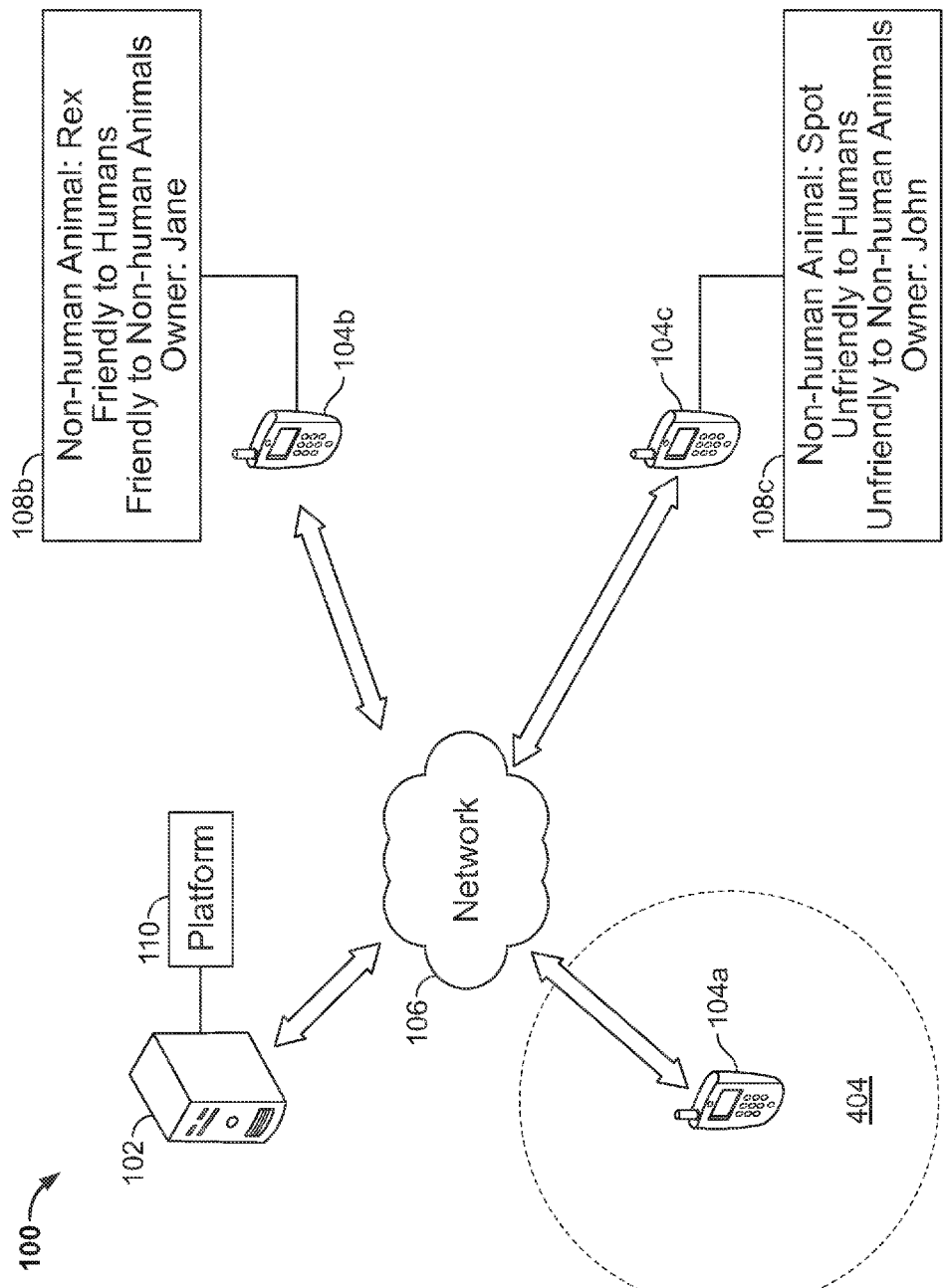
FIGS. 4A-4B are diagrams of a location-based alert function of an example system.
Figure 4B:
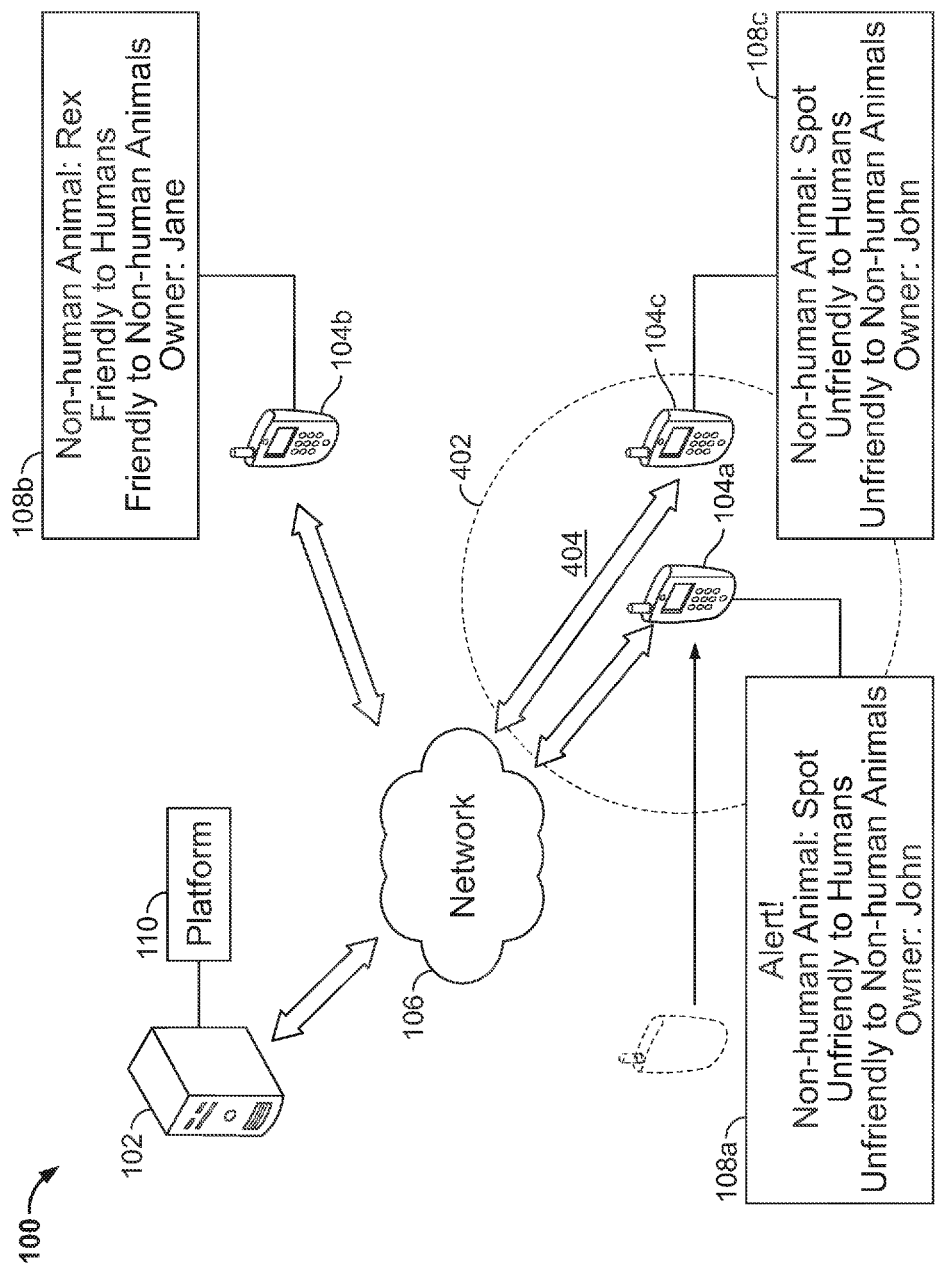

In some implementations, the platform 110 can be used to provide location-dependent alerts to users. As an example, platform 110 can be used to provide an alert to a user when he is in the vicinity of other user of platform 110. An example of this functionality is illustrated in FIGS. 4A-B. The system 100 shown in FIGS. 4A-B can be similar to that shown in FIG. 3. For example, system 100 includes a server system 102, a platform 110 maintained on server system 102, and three client devices 104*a-c*. As above, client devices 104*a-c* are mobile communications devices that are capable of communicating with the server system 102 via network 106. Client devices 104*a-c* are also geographically separated, and are relatively remote from each other. As above, in this example, the users of client devices 104*b-c* are owners of non-human animals, and use their respective client devices 104*b-c* (e.g., through a user interface 108*b-c*) to enter information about themselves and/or their non-human animals. In addition, the client devices 104*b-c* are location-aware, and can determine their geographic location, for example by communicating with a geo-positioning system. This information is transmitted from each client device 104*b-c* to the server system 102. The information transmitted to the server system 102 is processed and stored by the platform 110.

FIGS. 4A-4B also show another client device 104*a*. As shown in FIGS. 4A-4B, a boundary 402 is defined about the client device 104*a*. This boundary defines a proximity region 404 that surrounds the client device 104*a*. In the example shown in FIGS. 4A-B, the boundary 402 is illustrated as a circle, such that the region 404 encompasses an area within a particular radial distance from the client device 104*a*.

As shown in FIG. 4A, initially, the client device 104*a* is distant from the client devices 104*b-c*, and the client devices 104*b-c* are not within the proximity region 404. However, as shown in FIG. 4B, as the client device 104*a* moves towards the client devices 104*b-c*, the boundary 402 and proximity region 404 correspondingly move as well, and encompass the client device 104*b*. When the client device 104*b* enters the proximity region 404, an alert is generated by the client device 104*a*, and displayed on the user interface 108*a*. The alert can include, for example, information regarding the user of the client device 104*b*, information regarding the user's non-human animal, or any other information that the user of the client device 104*b* has chosen to share with the platform 110. In this manner, the user is notified when other users (and correspondingly, the other users' non-human animals) are within a particular distance from the user. Using this information, each user can, for example, seek interaction by traveling towards certain areas, or avoid interaction by walking away from other areas.

The client device 104*a* can determine if other client devices 104*b-c* are within the proximity region 404 in a variety of ways. For example, as detailed above, the client device 104*a* can receive information (e.g., periodically, continuously, or at arbitrary times) from the server 102 describing the location of the other client devices 104*b-c*. Upon receiving this information, the client device 104*a* can determine the distance from client device 104*a* to each client device 104*b-c* in order to determine if each client device 104*b-c* is within the proximity region 404. As the client device 104*a* continues to receive additional information, the distance determine is updated, and alerts are generated and presented as appropriate. As another example, in some implementations, the server system 102 can determine the distance of each client device 104*a-c* from one another. This distance information can be transmitted to each client device 104*a-c*, such that the client devices 104*a-c* need not individually determine these distances. As another example, in some implementations, the server system 102 can determine the distance of each client device 104*a-c* from one another, and generate an alert as appropriate. This alert can then be transmitted to the appropriate client device 104*a-c* and presented to the user. In this manner, in some implementations, the client device 104*a-c* need not perform distance determinations at all, and can instead rely on the server system 102 to perform this task.

In the example shown in FIGS. 4A-4B, the boundary 402 is circular, such that the proximity region 404 encompasses an area within a particular radial distance from the client device 104*a*. Thus, when another client device 104*b-c* is within a particular distance from the client device 104*a*, the user of client device 104*a* is notified with an alert. In some implementations, this distance can be a pre-determined distance. For example, the distance can be a pre-determined distance that is defined by the administrators of platform 110 (e.g., a globally defined setting), or a pre-determined distance that is defined by each user (e.g., a personal setting or preference). Further, although a circular boundary 402 is shown, in practice the boundary 402 can define any shape. For example, in some implementations, the boundary 402 can define a triangle, quadrilateral, pentagon, hexagon, or any other polygon, or an arbitrary shape about the client device 104*a*. In these implementations, instead of determining a distance from one client device 104*a-c* to other, another appropriate geometric determination can be made to determine if a client device is within the proximity region 404.

In the example shown in FIGS. 4A-4B, an alert is generated when a client device 104*b-c* enters the proximity region 404 of a client device 104*a*. In some cases, however, alerts can be filtered according to one or more filtering criteria. For example, a user may wish to receive alerts only when non-human animals that are friendly to humans are in his vicinity; in this case, the user can specify an appropriate filtering criterion, such that only alerts pertaining to human-friendly non-human animals are generated. As another example, a user may wish to receive alerts only when non-human animals that are unfriendly to other non-human animals are in his vicinity; in this case, the user can specify an appropriate filtering criterion, such that only alerts pertaining to non-human animals that are unfriendly to other non-human animals are generated. Although two examples of filtering criteria are described above, they are merely illustrative examples. In practice, alerts can be filtered according to any information about other users or non-human animals (e.g., a user's name, a non-human animal's name, a non-human animal's species or breed, the disposition of a non-human animal towards humans, the disposition of a non-human animal towards other non-human animals, demographic information regarding a user, demographic information regarding a non-human animal, and so forth). Further, although the above example describes the use of a single filtering criterion at a time, in practice a user can specify any number of filtering criteria in order to tailor alert generation to his preference. As an example, a user can specify multiple filtering criteria such that he only receives alerts pertaining to human-unfriendly dogs in his vicinity.

The example implementation shown in FIGS. 4A-4B is simplified to show a single boundary 402 and proximity region 404 for a single client device. In practice, each client device can have its own boundary 402 and proximity region 404. Thus, in some implementations, each user can use his client device to view alerts regarding the proximity of other user and their non-human animals according to user-specified settings.

Figure 5A:
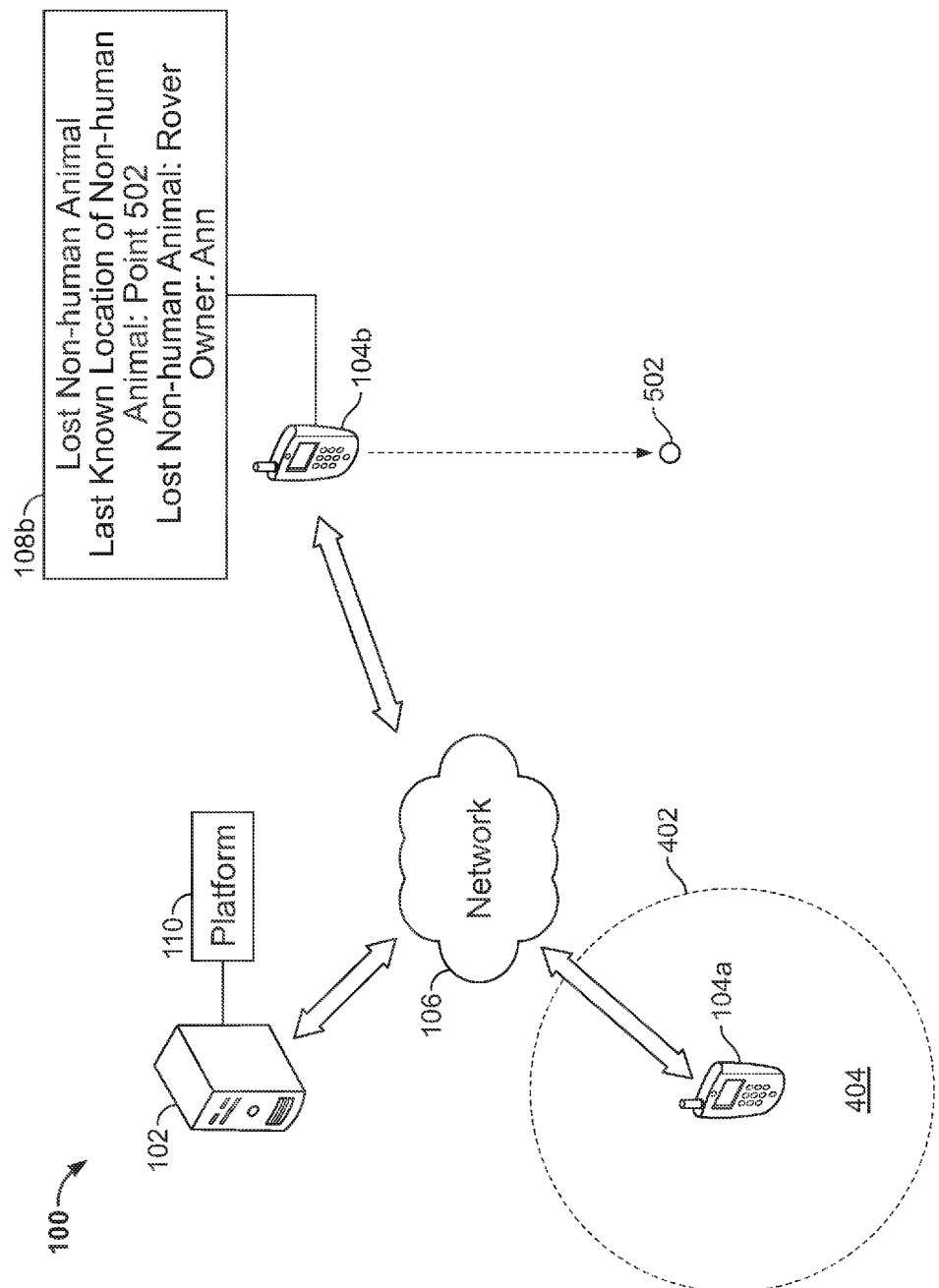
FIGS. 5A-5B are diagrams of another location-based alert function of an example system.
Figure 5B:
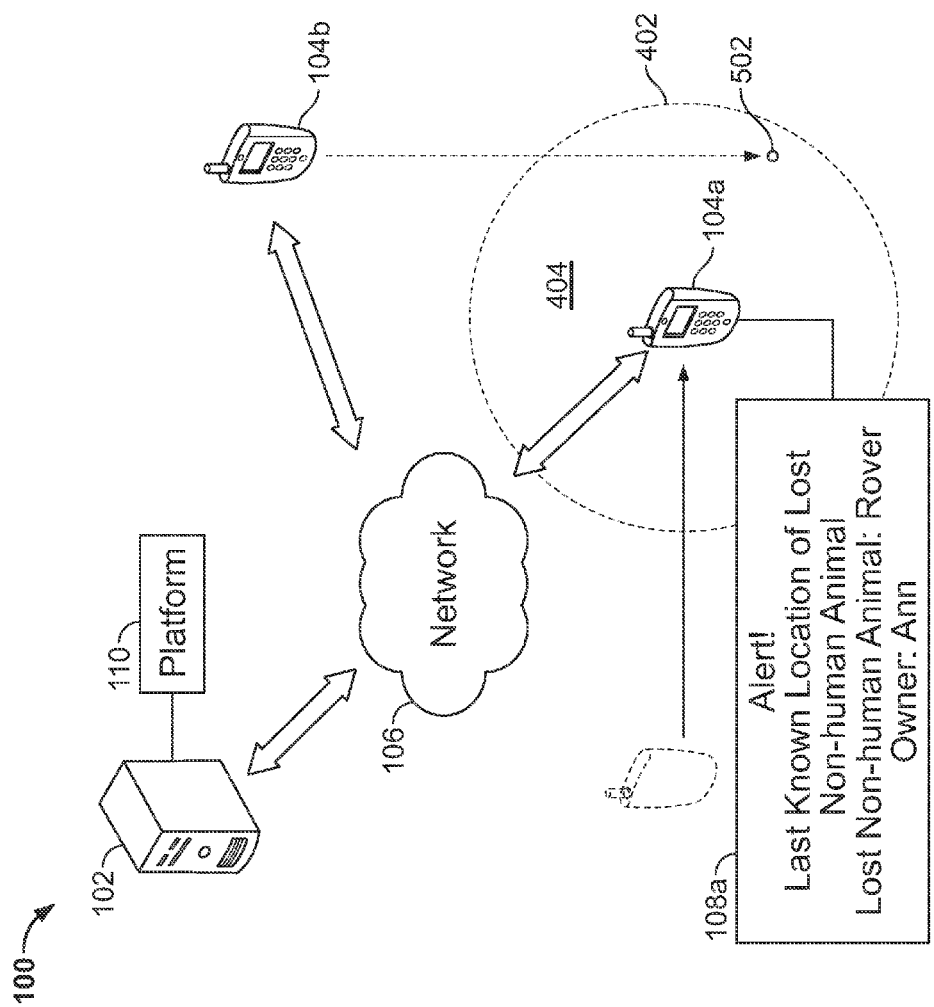

In some implementations, alerts can be used to notify users of other points of interest in their vicinity. For example, in some implementations, alerts can be used to notify a user when he is in the vicinity of the last known location of another person's lost non-human animal. Upon receiving the alert, the user can assist in the search effort. An example of this functionality is illustrated in FIGS. 5A-5B. The system 100 shown in FIGS. 5A-5B can be similar to that shown in FIGS. 3 and 4A-4B. For example, system 100 includes a server system 102, a platform 110 maintained on server system 102, and two client devices 104*a-b*. Client devices 104*a-b* can be mobile communications devices that are capable of communicating with the server system 102 via network 106. In this example, the user of client device 104*b* is an owner of a non-human animal, and uses his respective client device 104*b* (e.g., through a user interface 108*b*) to enter information about himself and/or his non-human animal. In addition, the client device 104*b* can be location-aware, and can determine its geographic location, for example by communicating with a geo-positioning system. This information is transmitted from the client device 104*b* to the server system 102. The information transmitted to the server system 102 is processed and stored by the platform 110.

In this example, the user of client device 104*b* has lost his non-human animal, and enters identifying information regarding the non-human animal through the user interface 108*b*. For example, the user can enter information such as the non-human animal's name, species or breed, size, weight, fur length, eye color, collar color, or any other features that might help others to identify the lost non-human animal. The user also can enter contact information (e.g., a telephone number, e-mail address, physical address, and so forth), such that other users can contact the user regarding the lost non-human animal (e.g., if the non-human animal has been found, or if other users would like to request additional information). The user also can enter information regarding the last known location 502 of the lost non-human animal. For example, the user can specify a particular address or geographical coordinates that identify the last known location 502. In some implementations, the last known location 502 may be remote from the current location of the client device 104b (e.g., as shown in FIGS. 5A-5B). In some implementations, the last known location 502 may be the same location as the client device 104b.

FIGS. 5A-B also show another client device 104a. In a similar manner as shown with respect to FIGS. 4A-B, as shown in FIGS. 5A-B, a boundary 402 is defined about the client device 104a. This boundary defines a proximity region 404 that surrounds the client device 104a. In the example shown in FIGS. 5A-B, the boundary 402 is illustrated as a circle, such that the region 404 encompasses an area within a particular radial distance from the client device 104a.

As shown in FIG. 5A, initially, the client device 104a is distant from the last known location 502, and the last known location 5-2 is not within the proximity region 404. However, as shown in FIG. 5B, as the client device 104a moves towards the last known location 502, the boundary 402 and proximity region 404 correspondingly move as well, and encompass the last known location 502. When the last known location 502 is within the proximity region 404, an alert is generated by the client device 104a, and displayed on the user interface 108a. The alert can include, for example, information regarding the user of the client device 104b (e.g., user or contact information), information regarding the users' lost non-human animal (e.g., identifying information regarding the lost non-human animal), or any other information that the user of the client device 104b has chosen to share with the platform 110. In this manner, the user is notified when he enters the vicinity of a last known location of a lost non-human animal. Using this information, each user may choose, for example, to assist in the search efforts and contact the owner if the non-human is found.

In a similar manner to that described above, the client device 104a can determine if the last known location 502 is within the proximity region 404 in a variety of ways. For example, as detailed above, the client device 104a can receive information (e.g., periodically, continuously, or at arbitrary times) from the server 102 describing the last known location 502. Upon receiving this information, the client device 104a can determine the distance from the client device 104a to the last known location 502 in order to determine if the last known location 502 is within the proximity region 404. As the client device 104a continues to receive additional information, the distance determine is updated, and alerts are generated and presented as appropriate. As another example, in some implementations, the server system 102 can determine the distance of the client device 104a from the last known location 502. This distance information can be transmitted to the client device 104a, such that the client device 104a need not individually determine this distance. As another example, in some implementations, the server system 102 can determine the distance of the client device 104a from the last known location 502, and generate an alert as appropriate. This alert then can be transmitted to the client device 104a and presented to the user. In this manner, in some implementations, the client device 104a need not perform distance determinations at all, and can instead rely on the server system 102 to perform this task.

As in FIGS. 4A-4B, the boundary 402 in the example shown in FIGS. 5A-5B is circular, such that the proximity region 404 encompasses an area within a particular radial distance from the client device 104a. Thus, when the last known location 502 is within a particular distance from the client device 104a, the user of client device 104a is notified by an alert. In some implementations, this distance can be a pre-determined distance. For example, the distance can be a pre-determined distance that is defined by the administrators of platform 110 (e.g., a globally defined setting), or a pre-determined distance that is defined by each user (e.g., a personal setting or preference). Further, although a circular boundary 402 is shown, in practice the boundary 402 can define any shape. For example, in some implementations, the boundary 402 can define a triangle, quadrilateral, pentagon, hexagon, or any other polygon, or an arbitrary shape about the client device 104a. In these implementations, instead of determining a distance from the client device 104a to the last known location 502, another appropriate geometric determination can be made to determine if a client device is within the proximity region 404.

In the example shown in FIGS. 5A-5B, an alert is generated by the device when the last known location 502 comes within the proximity region 404 of a client device 104a. In some cases, however, alerts can be filtered according one or more filtering criteria. For example, a user may wish to receive alerts only when he is entering the vicinity of the last known location of a particular species of non-human animal; in this case, the user can specify an appropriate filtering criterion, such that only alerts pertaining to lost non-human animals of a particular species are generated. As another example, a user may wish to receive alerts only when he is entering the vicinity of a last known location of a recently lost non-human animal; in this case, the user can specify an appropriate filtering criterion, such that only alerts pertaining to recently lost non-human animals (e.g., non-human animals reported a lost within a particular time of time) are generated. Although two examples of filtering criteria are described above, these are merely illustrative examples. In practice, alerts can be filtered according to any information about other users or non-human animals (e.g., a user's name, a non-human animal's name, a non-human animal's species or breed, the disposition of a non-human animal towards humans, the disposition of a non-human animal towards other non-human animals, demographic information regarding a user, demographic information regarding a non-human animal, and so forth). Further, although the above example describes the use of a single filtering criterion at a time, in practice a user can specify any number of filtering criteria in order to tailor alert generation to his preference. As an example, a user can specify multiple filtering criteria such that he only receives alerts pertaining to human-friendly dogs that were lost within the last week.

The example implementation shown in FIGS. 5A-5B is simplified to show a single boundary 402 and proximity region 404 for a single client device. In practice, each client device can have its own boundary 402 and proximity region 404. Thus, in some implementations, each user can use his client device to view alerts regarding the proximity of the last known location of lost non-human animals. Further, although the above example illustrates a single last known location 502, in practice, there may be multiple last known locations 502 defined by one or more users. In this manner, a user can be notified if he is in the vicinity of any of a number of last known locations 502 of lost non-human animals.

In the above examples, a user is alerted regarding the presence of other users and non-human animals in his vicinity, or when the user in the vicinity of the last known location of a lost non-human animal. In some implementations, similar alerts can be generated based on other location-dependent points of interest. For example, in some implementations, alerts can be generated if the user is in the vicinity of a particular event (e.g., a pet-related social gathering) or a particular store or service provider (e.g., a pet groomer or veterinarian). In some implementations, alerts can be generated only within a particular period of time, such that the information is more likely to be relevant to the user. For example, in some implementations, an alert regarding an event may be generated only for a particular time period before and during the event (e.g., to notify users of an upcoming or ongoing event). As another example, in some implementations, an alert regarding a store may be generated only when the store is open. Other criteria also can be used to determine when alerts should be generated and presented to users.

In the example shown in FIGS. 3, 4A-4B and 5A-4B, the client devices 104a-c are described as being mobile communications devices. In some implementations, one or more of the client device 104a-c can be relatively immobile (e.g., a desktop computer). In these implementations, relative immobile client devices 104a-c still can be used in the manner described above. For example, a relatively immobile client device 104a-c still can provide users with information regarding other non-human animals or users in his vicinity, or alert users in the manner described above.

In some implementations, the user of a client device 104a-c (mobile or immobile) can obtain information with respect to remote regions by selecting a remote geographical location (e.g., by selecting particular geographical coordinates or selecting a location from a graphical map). In a similar manner to that described above, information regarding this remote graphical location is provided to the user as if the user was actually positioned at that location. Thus, in some cases, a user can "simulate" movement to different graphical position in order to obtain information regarding a region of interest.

Figure 6:
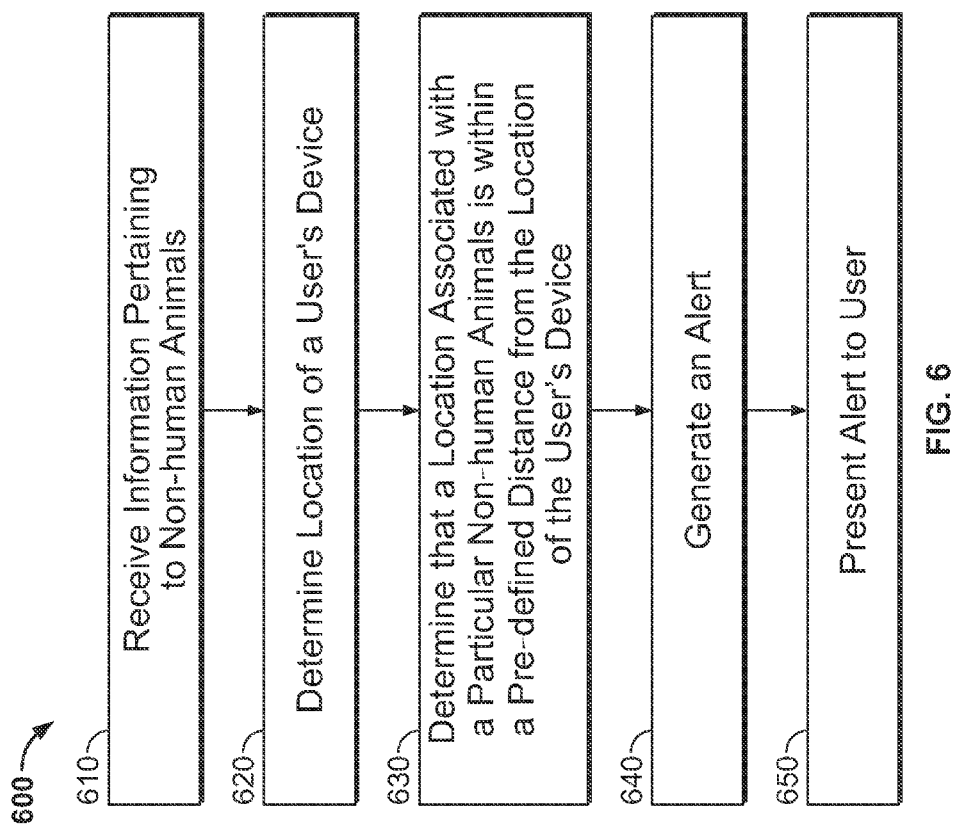
FIG. 6 is a flowchart of an example process for presenting non-human animal-related alerts.

An example process 600 to present non-human animal-related alerts is shown in FIG. 6. Implementations of process 600 can be performed, for example, by system 100 and/or client devices 104a-c.

The process 600 begins by receiving information pertaining to one or more non-human animals (step 610). As described above, in some implementations, users of client devices 104a-c can use their respective client devices 104a-c to enter information about themselves and/or their non-human animals. For example, each of the users can input information into a respective user interface 108a-c of his client device 108a-c, such as the name of his non-human animal, the name of the owner of the non-human animal, an indication of the non-human animal's disposition to others (e.g., whether the non-human animal is friendly to humans and/or other non-human animals), or other information that he wishes to share with others. In addition, the information can include an indication of a location associated with a non-human animal. For example, the information can include information that describes the location of a client device 104a-c, and correspondingly the location of a particular user and his non-human animal. As another example, the information can include information that describes the last known location of a lost non-human animal. This information can be received, for example, by a client device 104a-c and/or by a server system 102. For example, as described above, in some implementations this information can be individually sent from one or more client devices 104a-c to a server system 102, and at least a portion of this collected information can be sent from the server system 102 to particular client devices 104a-c. As described above, this information can be received continuously, periodically, on-demand (e.g., initiated by a user command), or at arbitrary times.

After receiving information pertaining to one or more non-human animals, the process 600 continues by determining a location of a user's device (step 620). As described above, in some implementations, a client device 104a-c can be location-aware, and can determine its geographic location, for example by communicating with a geo-positioning system (e.g., GPS, WiFi triangulation system). This location determination can be performed continuously, periodically, on-demand (e.g., initiated by a user command), or at arbitrary times.

After determining a location of a user's device, the process 600 continues by determining that a location associated with a particular non-human animal is within a pre-defined distance from the location of the user's device (step 630). As described above (e.g., with respect to FIGS. 4A-4B and 5A-5B), a determination can be made whether a location associated with a particular non-human animal is within a proximity region 404 about a client device 104a-c. This proximity region 404 can be, for example, a circle, a triangle, quadrilateral, pentagon, hexagon, or any other polygon, or an arbitrary shape about a client device 104a-c. As described above, in some implementations, the pre-determined can be defined by the administrators of platform 110 (e.g., a globally defined setting), or a pre-determined distance that is defined by each user (e.g., a personal setting or preference). In some implementations, this location determination can be made by a server system 102 or by a client device 104a-c.

After determining that a location associated with a particular non-human animal is within a pre-defined distance from the location of the user's device, the process 600 continues by generating an alert (step 640). As described above (e.g., with respect to FIGS. 4A-4B and 5A-5B), an alert can be generated in order to notify a user that he has entered the vicinity of another owner and his non-human animal, a last known location of a lost non-human animal, a non-human animal-related event, a pet store, or some other point of interest. In some implementations, an alert can be generated by a server system 102 or by a client device 104a-c. In some implementations, an alert can be generated by one device (e.g., the server system 102) and transmitted to another device (e.g., to a client device 104a-c).

After generating an alert, the process 600 continues by presenting the alert to the user (step 650). As described above (e.g., with respect to FIGS. 4A-4B and 5A-5B), an alert can be presented to the user through a user interface (e.g., a user interface 108a-c on a client device 104a-c). The alert can be presented in a variety of ways. For example, in some implementations, an alert can be presented in the form of a pop-up notification, such that the alert is displayed over other information displayed on the device's user interface. A user can view the alert, then dismiss the alert or save the alert for future retrieval. As another example, in some implementations, an alert can be presented in the form of an icon or other reduced representation (e.g., a system tray icon, a notification "drawer" icon, or other such representation). In this manner, the user is presented with the alert in such a way that it does not obscure other information displayed on a user interface. A user can view the alert (e.g., by selecting the icon), then dismiss the alert or save the alert for future retrieval. In some implementations, an alert can be presented as an audio notification (e.g., a particular alert sound) or as haptic notification (e.g., a particular vibration from a haptic feedback device of the client device). In some implementations, an alert can be presented as a combination of visual, audio, and/or haptic elements.

In some cases, one or more implementations can be used in conjunction with other social media platforms. For instance, in some implementations, the platform 110 can be in communication with another social media platform, such that the platform 110 the other social media platform can exchange information. For example, the platform 110 might receive a user's name and contact information from another social media platform, and the platform 110 might transmit information regarding the user's non-human animal to the social media platform. This information can be interpreted by each platform as if a user had manually entered this information into each respective platform. This can, for example, reduce the need for duplicative data entry by the user across different platforms. In some implementations, the platform 110 and the other social media platform might share a common authentication system that allows a user to create and maintain user accounts on each platform using common authentication credentials.

Figure 7A:
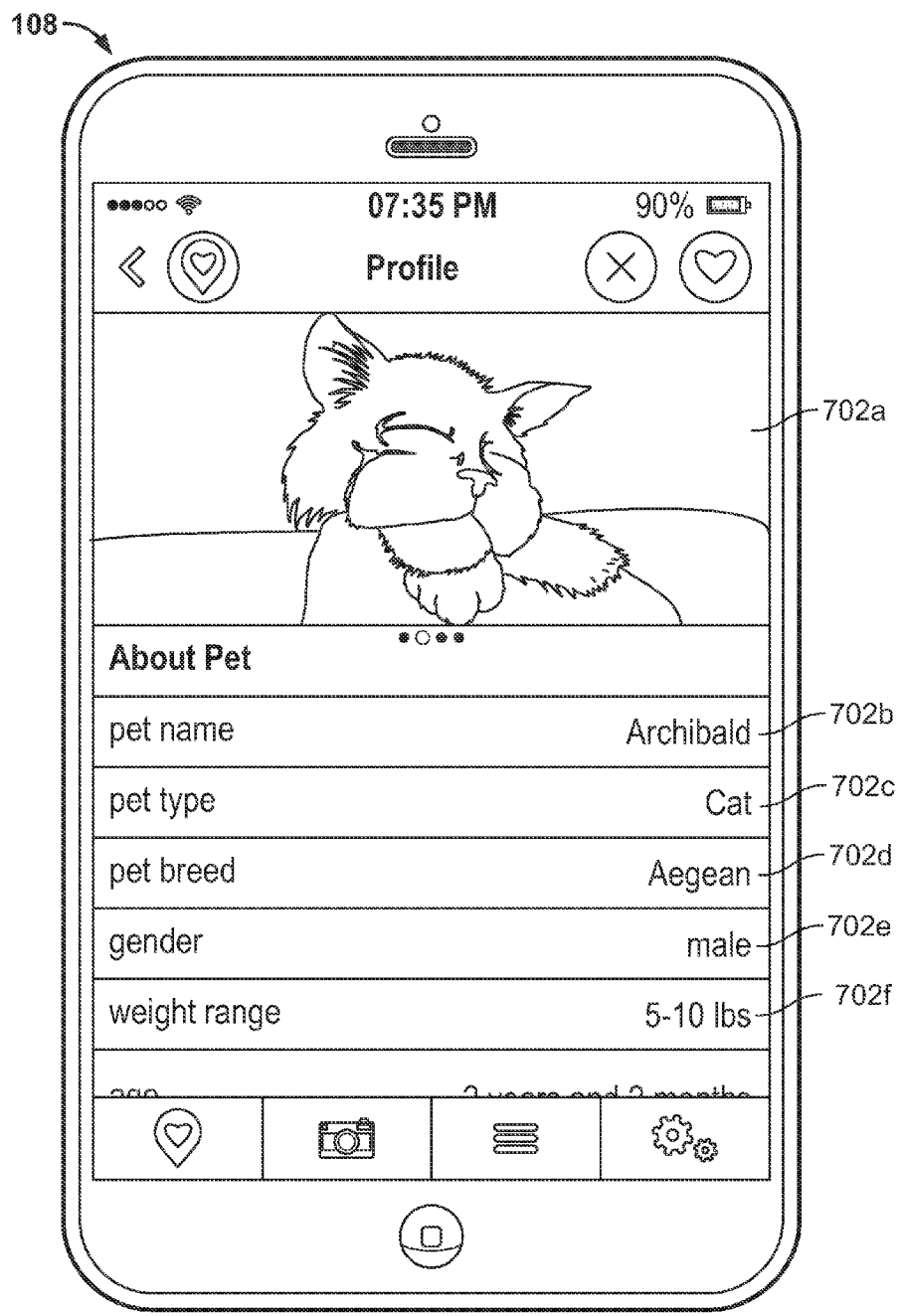
FIGS. 7A-7D are diagrams of example user interfaces.

Example user interfaces 108 are shown in FIGS. 7A-7D. Referring to FIG. 7A, an example user interface 108 allows a user to enter information regarding his non-human animal. For example, the user interface 108 can present the user with one or more editable data fields 702a-f that allow the user to create a "profile" for his non-human animal. For example, the user can select a particular image of his non-human animal for the data field 702a, the name of his non-human animal for the data field 702b, the type of non-human animal (e.g., species) for the data field 702c, the breed of non-human animal for the data field 702d, the gender of the non-human animal for data field 702e, the weight of the non-human animal for data field 702f, and so forth. In some cases, the user can select an entry from among several different choices; as an example, the user might be presented with a drop-down menu that provides a list of possible types of non-human animals from which the user can select. In some cases, the user can specify an entry by entering text (e.g., by entering text from a physical or virtual keyboard). In some cases, the user can specify an entry by selecting a particular data object stored on a device (e.g., by selecting an image, a text file, or some other data object). Although an example user interface 108 is shown in FIG. 7A, this is merely illustrative. A user interface 108 can have other data fields, a different number of data fields, and a different arrangement of data fields, depending on the implementations.

Figure 7B:
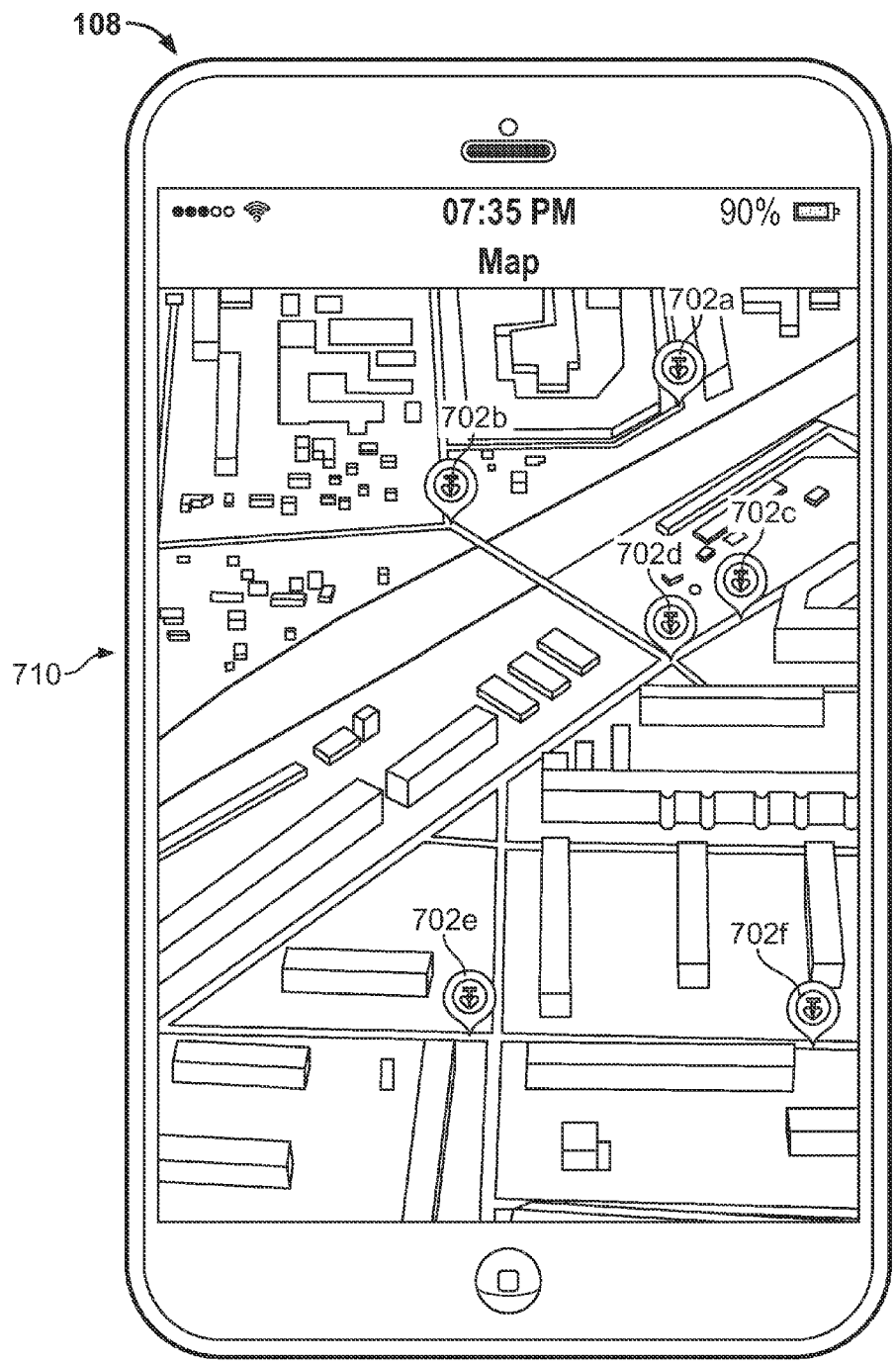

Referring to FIG. 7B, an example user interface 108 is shown that allows a user to view a visual representation of his surroundings (e.g., as a graphical map). For example, the user interface 108 can present the user with a map 710 that shows the present location of the user, and the surrounding geographical and structural features of the surrounding area. The map 710 can also include one or more markers 712a-f that indicate particular points of interest in the user's vicinity. As examples, the markers 712a-f can indicate the location of another user and his non-human animal, the last known location of a lost non-human animal, an event, or a store. In some implementations, the markers 712a-f have different visual appearances in order to indicate different points of interest. For example, the location of owners and their non-human animals might have a certain colored or shaped marker, whereas the last known locations of lost non-human animals might have markers having different colors or shapes. In some implementations, the markers 712a-f can be used to provide additional information regarding the point of interest. For example, in some implementations, a non-human animal that is friendly to humans might correspond to a marker having a particular color or shape, whereas a non-human animal that is unfriendly to humans might correspond to a marker having a different color or shape. In some implementations, the user can select a particular marker in order to obtain more information regarding the selected point of interest. As above, although an example user interface 108 is shown in FIG. 7B, this is merely illustrative. A user interface 108 can have other elements and arrangement of elements, depending on the implementations.

Figure 7C:
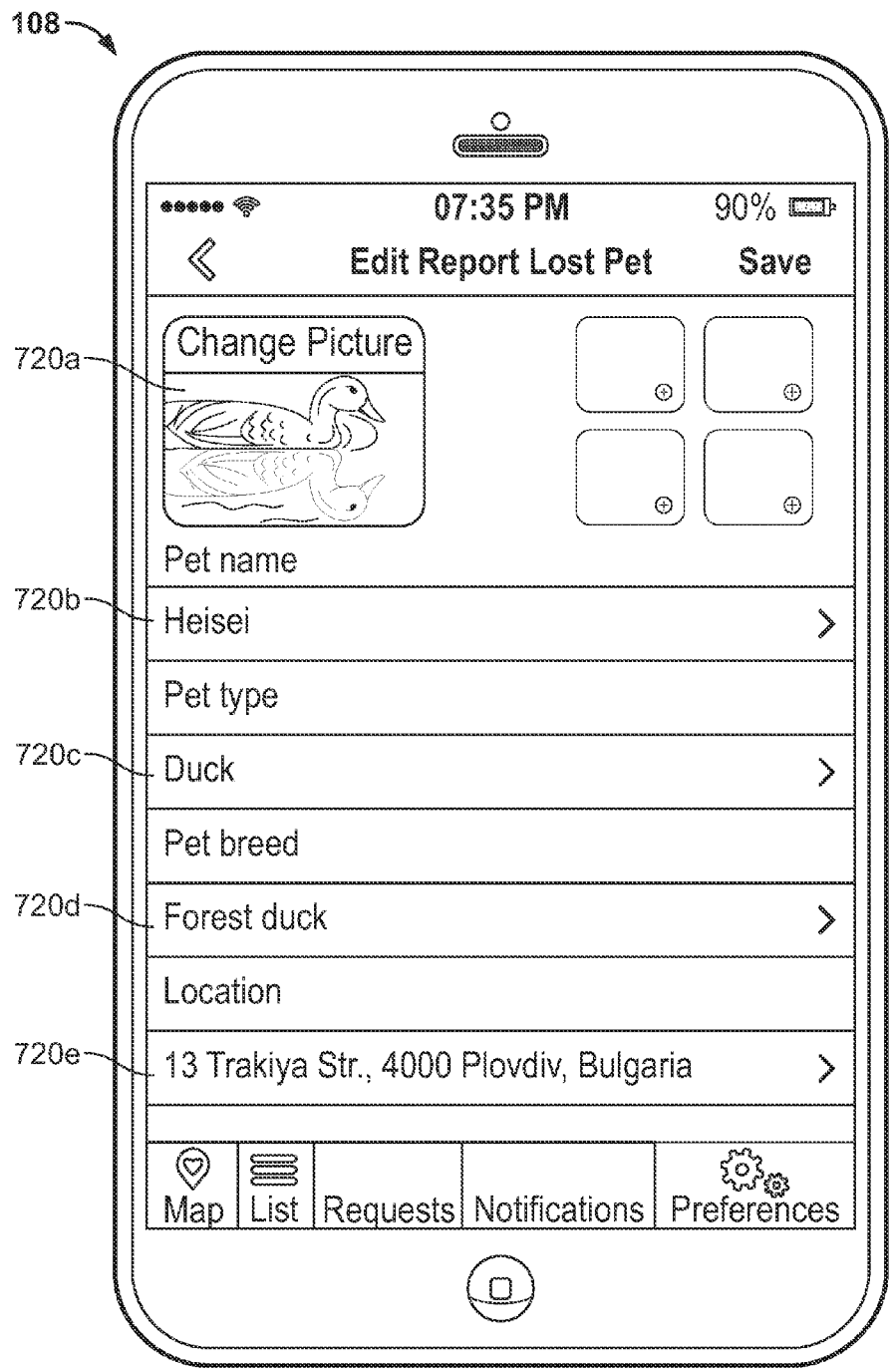

Referring to FIG. 7C, an example user interface 108 is shown that allows a user to enter information regarding a lost non-human animal. For example, the user interface 108 can present the user with one or more editable data fields 720a-e that allow the user to create a lost report for his non-human animal. For example, the user can select a particular image of his non-human animal for the data field 720a, the name of his non-human animal for the data field 720b, the type of non-human animal (e.g., species) for the data field 720c, the breed of non-human animal for the data field 720d, the last known location of the non-human animal for data field 720e, and so forth. As above, in some cases, the user can select an entry from among several different choices (e.g., from a drop-down menu), and in some cases, the user can specify an entry by entering text. In some cases, the user can specify an entry by selecting a particular data object stored on a device. Although an example user interface 108 is shown in FIG. 7C, this is merely illustrative. A user interface 108 can have other data fields, a different number of data fields, and a different arrangement of data fields, depending on the implementations.

Figure 7D:
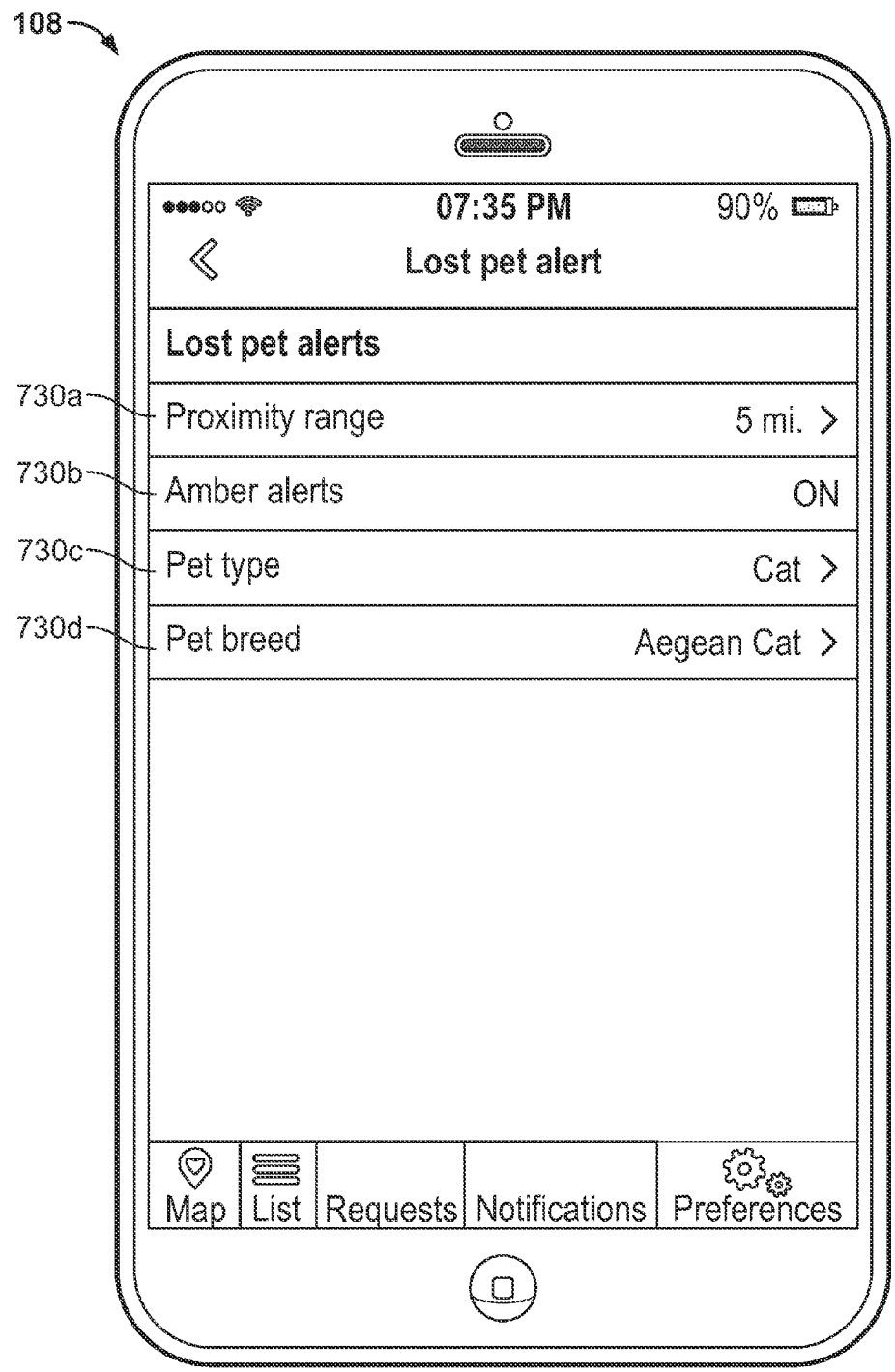

Referring to FIG. 7D, an example user interface 108 is shown that allows a user to enter specify filtering criteria for receiving alerts. For example, the user interface 108 can present the user with one or more editable data fields 730a-d that allow the user to specify what types of alerts he wishes to receive. For example, for a lost non-human animal alert, the user can specify a particular distance for data field 730a-d, such that he will only receive alerts when he is within a particular distance from the last known location of a lost non-human animal. As another example, the user can selectively turn the alerts for lost non-human animals on or off using the data field 730b, select a particular type of animal using the data field 730c, and select a particular animal breed using 730d. In this manner, the user can filter the types of alerts he will receive selectively. As above, in some cases, the user can select an entry from among several different choices (e.g., from a drop-down menu), and in some cases, the user can specify an entry by entering text. In some cases, the user can specify an entry by selecting a particular data object stored on a device. Although an example user interface 108 is shown in FIG. 7D, this is merely illustrative. A user interface 108 can have other data fields, a different number of data fields, and a different arrangement of data fields, depending on the implementations.

Implementations of the above can be used with respect to any non-human animal. As an example, some implementations can be used with respect to pets (e.g., cats, dogs, birds, reptiles, and so forth), livestock (e.g., cows, sheep, pigs, and so forth), work animals (e.g., horses, mules, donkeys, oxen, and so forth), or any other non-human animal. As another example, some implementations can be used with respect to undomesticated animals (e.g., wild lions, tigers, bears, elephants, and so forth). In someone implementations, one or more client device 104a-c can be affixed to an animal, such that it automatically reports on the location of the animal to the server system 102 and the other client devices 104a-c.

Although several system configurations are shown above, these are only example to illustrate how various components of a system can be positioned either local to each other or remote to each other, depending on the application. Other system configurations are possible.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, server system 102, platform 110, and client devices 104a-c can be implemented using digital electronic circuitry, or in computer software, firmware, or hardware, or in combinations of one or more of them. In another example, process 600 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 8:
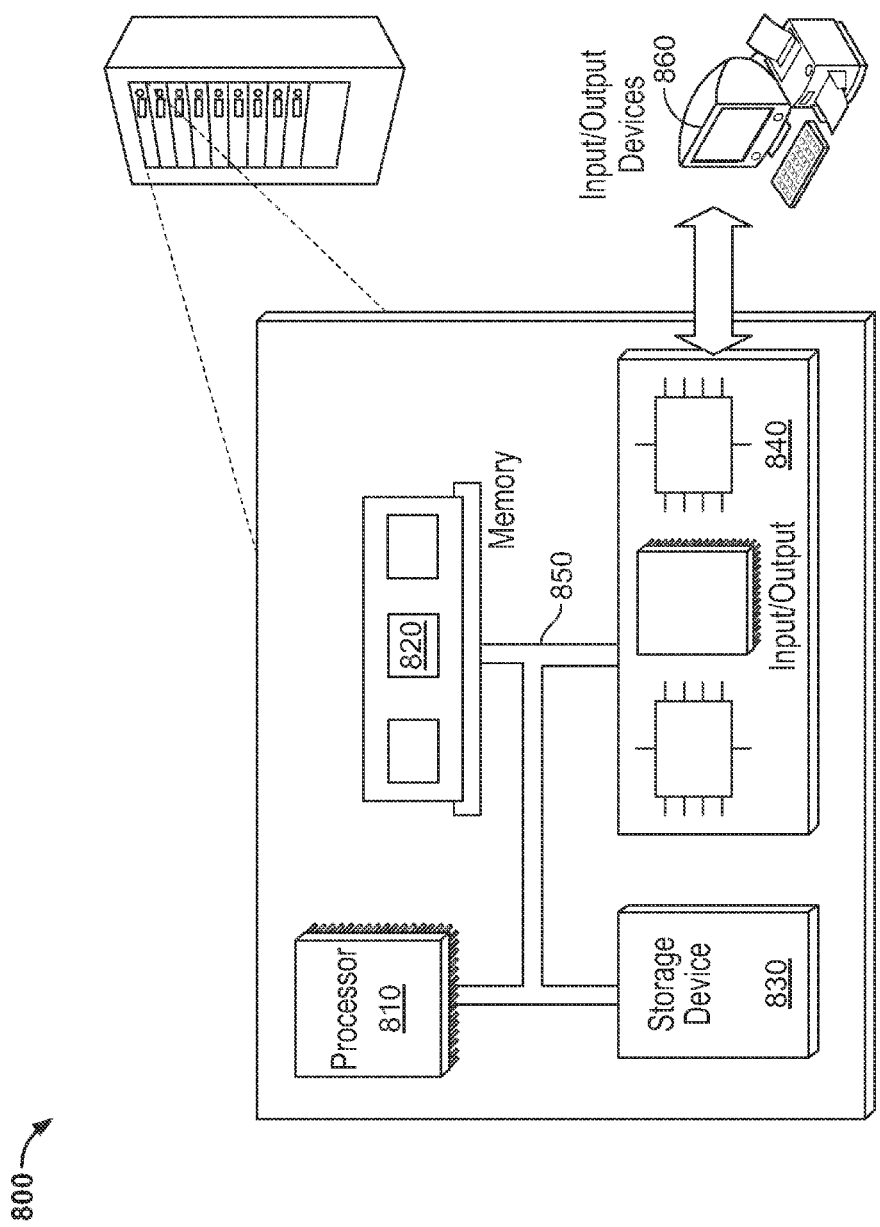
FIG. 8 is a diagram of an example computer system.

FIG. 8 shows an example computer system 800 that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A method of presenting animal-related alerts, the method comprising:
   receiving, in a user's mobile device, information pertaining to a plurality of non-human animals,
      wherein the information pertaining to the plurality of non-human animals is received from a platform module of a server system; and
      wherein the information comprises, for each non-human animal, an indication of a location associated with that non-human animal and an indication of that non-human animal's disposition towards others;
   determining, using the user's mobile device, a location of the user's mobile device;
   determining, using the user's mobile device, that a location associated with a particular one of the non-human animal is within a pre-defined distance from the location of the user's mobile device;
   subsequently generating, using the user's mobile device, an alert,
      wherein the alert comprises information pertaining to that particular non-human animal including the indication of the location associated with that non-human animal and the indication of that non-human animal's disposition towards others;
   determining, using the user's mobile device, that the information pertaining to that particular non-human animal satisfies one or more filtering criteria,
      wherein the one or more filtering criteria comprises a particular time period, a particular physical characteristic, and/or particular identifying information associated with at least a subset of the plurality of non-human animals;
   upon determining that the information pertaining to that particular non-human animal satisfies one or more filtering criteria, presenting the alert to the user using a user interface of the user's mobile device; and
   sharing information pertaining to the user with one or more other users,
      wherein sharing information pertaining to the user with one or more other users comprises transmitting, using the user's mobile device, the location of the user's mobile device to the platform module of the server system.

2. The method of claim 1, wherein at least one of the locations associated with a non-human animal corresponds to a current location of a particular non-human animal.

3. The method of claim 1, wherein at least one of the non-human animals was reported as lost, and wherein the location associated with that lost non-human animal corresponds to a reported last known location of the lost non-human animal.

4. The method of claim 1, wherein the pre-defined distance corresponds to a boundary about the location of the user's mobile device.

5. The method of claim 4, wherein the boundary is circular or polygonal.

6. The method of claim 1, further comprising:
   presenting, using the user interface of the user's mobile device, at least a portion of the information pertaining to the plurality of non-human animals to the user.

7. The method of claim 6, wherein presenting at least a portion of the information pertaining to the plurality of non-human animals comprises generating a graphical map depicting a region surrounding the location of the user's mobile device.

8. The method of claim 7, wherein the graphical map includes one or more icons, each icon corresponding to one of the non-human animal.

9. The method of claim 8, wherein each icon comprises an indication of a particular non-human animal's disposition towards others.

10. The method of claim 9, wherein the indication is a pre-determined color.

11. A system for presenting animal-related alerts, the system comprising:
   a server system coupled to a platform module; and
   a plurality of mobile user devices each coupled to a respective client module, wherein each client module is operable to:
      receive information pertaining to a plurality of non-human animals,
         wherein the information pertaining to the plurality of non-human animals is received from the platform module; and
         wherein the information comprises, for each non-human animal, an indication of a location associated with that non-human animal and an indication of that non-human animal's disposition towards others;
      determine a location of the respective user's mobile device;
      determine that a location associated with a particular one of the non-human animal is within a pre-defined distance from the location of the respective user's mobile device;
      subsequently generate an alert,
         wherein the alert comprises information pertaining to that particular non-human animal including the indication of the location associated with that non-human animal and the indication of that non-human animal's disposition towards others;

determine that the information pertaining to that particular non-human animal satisfies one or more filtering criteria, wherein the one or more filtering criteria comprises a particular time period, a particular physical characteristic, and/or particular identifying information associated with at least a subset of the plurality of non-human animals;

upon determining that the information pertaining to that particular non-human animal satisfies one or more filtering criteria, present the alert to the user using a user interface of the respective user's mobile device; and share information pertaining to the user with one or more other users, wherein sharing information pertaining to the user with one or more other users comprises transmitting the location of the respective user's mobile device to the platform module.

12. The system of claim 11, where at least one of the locations associated with a non-human animal corresponds to a current location of a particular non-human animal.

13. The system of claim 11, wherein at least one of the non-human animals was reported as lost, and wherein the location associated with that lost non-human animal corresponds to a reported last known location of the lost non-human animal.

14. The system of claim 11, wherein the pre-defined distance corresponds to a boundary about the location of the user's mobile device.

15. The system of claim 14, wherein the boundary is circular or polygonal.

16. The system of claim 11, wherein each client module is further operable to:

present, using the user interface of the user's mobile device, at least a portion of the information pertaining to the plurality of non-human animals to the user.

17. The system of claim 16, wherein presenting at least a portion of the information pertaining to the plurality of non-human animals comprises generating a graphical map depicting a region surrounding the location of the user's mobile device.

18. The system of claim 17, wherein the graphical map includes one or more icons, each icon corresponding to one of the non-human animal.

19. The system of claim 18 wherein each icon comprises an indication of a particular non-human animal's disposition towards others.

20. The system of claim 19, wherein the indication is a pre-determined color.

* * * * *